S. WOODRUFF.
Hand Seeder.

No. 20,014.

Patented Apr. 20, 1858.

UNITED STATES PATENT OFFICE.

SAMUEL WOODRUFF, OF SPARTA, NEW JERSEY.

IMPROVEMENT IN SEED-PLANTING HOES.

Specification forming part of Letters Patent No. 20,014, dated April 20, 1858.

*To all whom it may concern:*

Be it known that I, SAMUEL WOODRUFF, of Sparta, in the county of Sussex and State of New Jersey, have invented a new and Improved Seed-Planting Attachment to be Applied to Ordinary Hand-Hoes; and I do hereby declare that the following is a full, clear, and exact description of the same, reference being had to the annexed drawings, making a part of this specification, in which—

Figure 1:
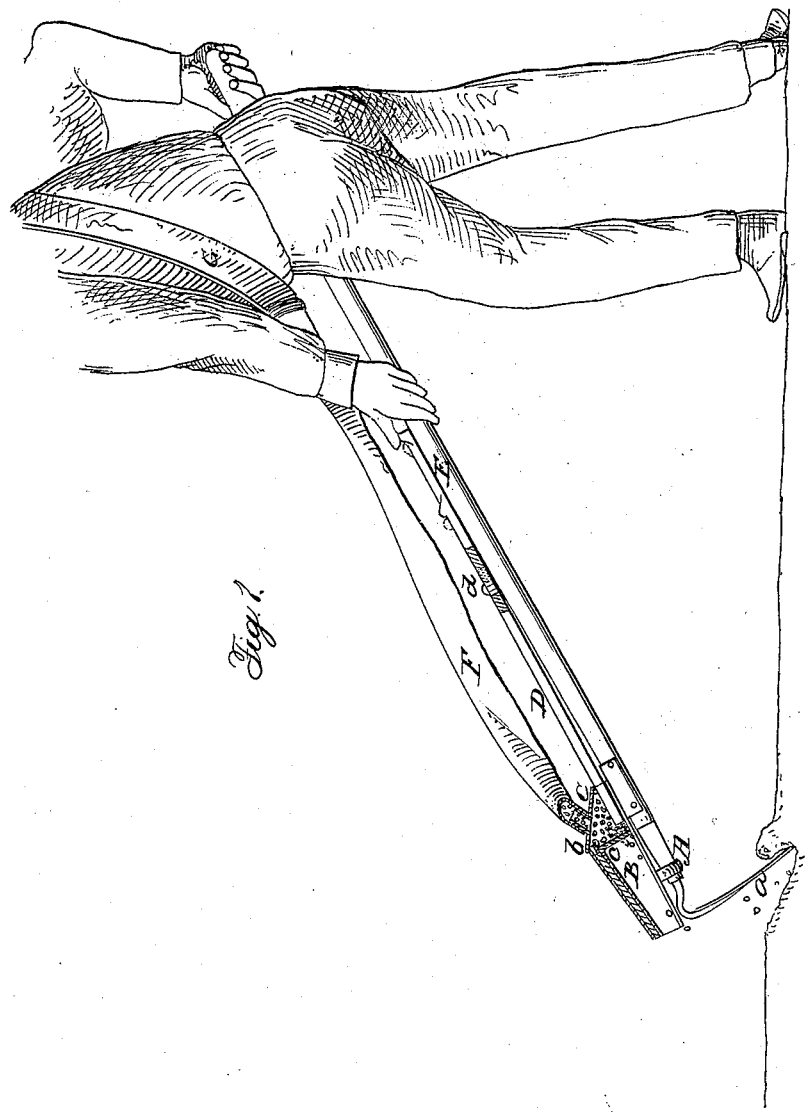
Figure 2:
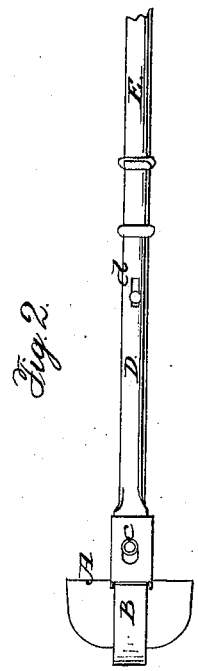

Figure 1 is a longitudinal section of my invention represented attached to a hoe in actual use. Fig. 2 is a top or plan view of the same.

Similar letters of reference indicate corresponding parts in the two figures.

This invention consists in the employment or use of a small box attached to the back of the hoe, provided with a valve and plunger and used in connection with a seed receptacle or sack, which is placed or slung around the shoulder of the operator, and made to communicate with the distributing device by means of a flexible tube, the whole being arranged, as hereinafter fully shown and described, so that the device may be readily applied to any ordinary hoe and used by the operator with the greatest facility, the seed being planted and covered by the implement equally as quick as the ordinary process of covering alone by means of the hoe.

To enable those skilled in the art to fully understand and construct my invention, I will proceed to describe it.

A represents an ordinary hand-hoe, and B is a small case or box which is attached to the back of the hoe in any proper way. The case or box may be so arranged that it may slide on and off the shank or goose-neck of the hoe, the outer end of the box being about flush with the front or outer face, *a*, of the blade of the hoe, as shown in Fig. 1. The case or box B may be of quadrilateral form, and a valve, C, is fitted within it. This valve C is formed of a piece of india-rubber, leather, or other suitable flexible material, of a size to fit snugly within the case at right angles with its sides, the upper end of the valve being attached to the case, as shown at *b*. The valve is made of sufficiently thick material to prevent it moving casually. The front end of the case B is open; but the back end is closed by a slide, *c*, space, however, being allowed for the end of a plunger, D, to work therein. The plunger D is fitted on the back of the handle E of the hoe, and is secured thereto by a guide-pin, *d*, which passes through a slot in the plunger, and permits of a certain degree of longitudinal play. (See Fig. 2.) To the slide *c* a flexible tube, F, is attached. This tube communicates with the interior of the case or box B, and also with the lower end of a sack, G, which is slung around one of the shoulders of the operator, as shown clearly in Fig. 1. The plunger D extends along the handle E sufficiently far to allow the operator to actuate the same with the thumb of his left hand.

The operation is as follows: The sack G is filled with corn or other seed which is to be planted. The operator places the sack around his shoulder and attaches the tube E to the inner end of box B, which is secured to the hoe in the position as described, and shown in Fig. 1. The hole in the earth to receive the seed is made by one motion of the hoe, and, as shown, as the hole is made the operator pushes forward the plunger D with his thumb, and the front end of the plunger forces out a quantity of seed that is between the valve C and the end of the plunger. (See red lines Fig. 1.) Said seed falls out the front end of the box into the hole made to receive it. The seed is then covered by a backward movement of the hoe, and at the same time the plunger G is drawn back by the thumb of the operator, so that a quantity of seed may again pass down between the valve C and the end of the plunger D, to be again forced out by the succeeding forward movement of the plunger. The backward movement of the plunger D is controlled by the pin D, so that the proper space will always be allowed for the reception of the seed between the valve and plunger. It will be understood that the valve B returns to its original position upon the withdrawal of the plunger D by its own elasticity. This device is extremely simple, and may be attached to any ordinary hoe at a small cost.

I am aware that seed-distributing devices have been attached to hoes, and arranged in various ways in order that the seed may be distributed, the holes made to receive it, and the seed covered at one operation, and I therefore do not claim separately any of the parts herein shown and described; but,

Having thus described my invention, what I claim as new, and desire to secure by Letters Patent, is—

The box B, provided with the valve C, and plunger D, attached to the hoe and used in connection with the sack or receptacle G, placed on the operator and communicating with the box B by means of the flexible tube E, the whole being arranged substantially as and for the purpose set forth.

SAML. WOODRUFF.

Witnesses:
WARREN SHINER,
B. F. SHERWOOD.